(12) United States Patent
Cocetta et al.

(10) Patent No.: US 6,507,178 B2
(45) Date of Patent: Jan. 14, 2003

(54) SWITCHING TYPE BANDGAP CONTROLLER

(75) Inventors: Franco Cocetta, Premariacco (IT); Giorgio Rossi, Nerviano (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/944,065

(22) Filed: Aug. 30, 2001

(65) Prior Publication Data

US 2002/0036489 A1 Mar. 28, 2002

(30) Foreign Application Priority Data

Aug. 31, 2000 (EP) .............................. 00830594

(51) Int. Cl.$^7$ ............................ G05F 3/16; G05B 11/00
(52) U.S. Cl. ........................................ 323/313; 318/687
(58) Field of Search ................................ 323/313, 314, 323/312, 315, 281, 287; 327/538; 361/153, 253, 160; 318/687, 678, 135; 123/630, 644

(56) References Cited

U.S. PATENT DOCUMENTS

| | | | | |
|---|---|---|---|---|
| 4,064,448 A | * | 12/1977 | Eatock | 323/281 |
| 4,280,166 A | * | 7/1981 | Jesse et al. | 361/253 |
| 4,388,586 A | | 6/1983 | Lamoth | 323/283 |
| 4,446,410 A | * | 5/1984 | Yagura et al. | 318/687 |
| 4,525,663 A | * | 6/1985 | Henry | 323/280 |
| 4,661,766 A | * | 4/1987 | Hoffman et al. | 323/287 |
| 4,967,309 A | * | 10/1990 | Hoffman | 361/160 |
| 5,166,543 A | * | 11/1992 | Schneider et al. | 307/264 |
| 5,735,254 A | * | 4/1998 | Palara et al. | 123/644 |
| 5,963,082 A | | 10/1999 | Dick et al. | 327/538 |

FOREIGN PATENT DOCUMENTS

| | | |
|---|---|---|
| DE | 196 20 181 C1 | 9/1997 |
| EP | 0 656 574 A1 | 6/1995 |
| EP | 0 713 166 A1 | 5/1996 |
| EP | 0 751 451 A1 | 1/1997 |

* cited by examiner

Primary Examiner—Rajnikant B. Patel
(74) Attorney, Agent, or Firm—Lisa K. Jorgenson; Robert Iannucci; Seed IP Law Group PLLC

(57) ABSTRACT

An integrated self-powered and switching electronic circuit regulates a stable reference voltage and comprises a bandgap voltage generator to produce said stable reference voltage for a system circuit block that is generally supplied by the output of the band-gap generator through a comparator and an error amplifier. A regulating loop is provided between the output of the system block and the input of the voltage generator circuit to supply a voltage signal produced by the output of the system block. Advantageously, the voltage generator circuit incorporates both the comparator and the error amplifier.

21 Claims, 3 Drawing Sheets

SWITCHING TYPE BANDGAP CONTROLLER

BACKGROUND OF THE INVENTION

1. Field of the Invention

This invention relates to a switching type bandgap controller.

More specifically, but not exclusively, the invention relates to a self-powered electronic circuit for regulating a stable reference voltage, which circuit comprises a band-gap generator to produce said stable reference voltage, comprises a system circuit block supplied by a controlled voltage obtained from said reference voltage through a comparator and an error amplifier to output a regulated voltage, and comprises a regulating loop inserted between said output and the output of the band-gap generator and including a normalizer block.

The invention also relates to a regulating method implemented by said electronic circuit.

More particularly though not exclusively, the invention relates to a voltage regulator for automotive applications, and the following description will cover this application field for convenience of illustration.

2. Description of the Related Art

As it is well known in this field, electronic regulating systems for generating stabilized voltage references are usually supplied by a voltage deriving from an external source.

For instance in the technology of electronic microcircuits, a so-called band-gap regulating system is often used which is intended to generate a stable voltage reference from a usually pre-stabilized dedicated supply line.

For example, let's consider a first prior art solution disclosed in the U.S. Pat. No. 4,388,586 relating to a voltage regulator for an automotive alternator. This voltage regulator is provided with a precision reference voltage source 28 of the band-gap type.

The alternator output voltage 26 is compared with the band-gap reference voltage inside the comparator 44. The reference voltage source 28 is an independent block.

The German patent No. DE 196 20 181 C relates to a circuit block for producing a reference output voltage Vout. The circuit block determines an absolute voltage value Vr(To), set for a specific temperature value, and a temperature coefficient Tc=dVr/dT that is constant in specific working temperature range. The reference output voltage is obtained from these two values.

Another known solution is disclosed in the EP application No. 0751451 concerning a reference voltage regulator having a double slope temperature characteristic. The reference voltage is produced using a couple of voltage references VrA, VrB each having a predetermined temperature behavior.

A further prior art solution is disclosed in the U.S. Pat. No. 5,963,082 concerning a circuit arrangement for producing a D.C. current. An output current having a negative voltage coefficient is produced on the output terminal 27. This output current is obtained by a final mirroring of a current flowing through the resistor 17 and by a mirror circuit portion including the circuit components 24, 25, 28 and 29.

All the above prior art solutions work with voltages or currents that are just variable in temperature, but not variable in time.

Now, for a better understanding of the invention, we will examine hereinafter the problem of controlling an automotive alternator by a regulated voltage. However, differently from the above cited prior art solutions, the invention doesn't relate to the generation of a voltage ramp for controlling a PWM signal.

In FIG. 1 of the accompanying drawings, a block diagram (A) is shown that provides an example of how a reference voltage signal Vr is generated. The reference voltage signal Vr, also known as the set-point signal, is generated by a Band-Gap block 11 connected to a supply line 5. A regulator loop circuit 1 produces an output signal Vsense=k·Vr. Therefore, the voltage signal Vr is the "set point" signal for the regulator loop 1.

The signal SENSE at the output node OUT represents the variable to be controlled, that is the output signal of a system block 2 which may be for example a drive circuit portion of an alternator. This signal SENSE, following to a normalizing phase inside a block 3 placed in a feedback loop, is compared with the reference voltage signal Vr by a comparator 6 to obtain a modified reference voltage that is amplified by an amplifier block 4, in order to generate a control voltage of the system block 2.

The regulator loop, specifically the normalizing block 3, functions to make the value of the signal SENSE K times greater than the reference signal Vr, that is: Vsense=k·Vr.

Usually, the signals involved in the loop regulator circuit 1 are translated into voltage signals using small amounts of electric power.

The supply line, designated at 5 in the scheme of FIG. 1 is not always stabilized. In fact, in some applications as the ones of the voltage regulators for automotive alternators, the supply voltage on the line 5 may show negative pulses of considerable depth and duration, as shows the diagram of FIG. 2.

The ordinate of this diagram is the output voltage VGO (Voltage Generator Output) of an automotive alternator, which also represents the supply to the regulator circuit 1 on the line 5. The controlled signal SENSE is represented by the battery voltage of the vehicle. It can be understood that, since the average voltage of the controlled signal is of 14.5V and the fast surges of about 15V, the minimum voltage on the supply line 5 may drop to zero volt and below.

Heretofore, it has been trying to solve surge situations, as the ones shown in FIG. 2, by setting a lower voltage limit, under which the designer of the alternator or, more generally, of the supply line should not go.

Alternatively, a regulator circuit of hybrid structure, that is of the type comprising a monolithically integrated portion and a discrete component portion, could be used. This alternative solution allows to solve the surge problem, since the hybrid technology provides for sufficient capacitance values to counterbalance the voltage drops. However, the same structure available in hybrid form is obviously not proposable in a totally integrated form, since the capacitances of the required value can practically not be integrated.

Although in many ways advantageous and currently used for several applications, the above-discussed technical solutions tend to be economically disadvantageous, from both standpoints of electric power consumption and technical complexity.

BRIEF SUMMARY OF THE INVENTION

An embodiment of this invention provides an integrated electronic circuit for regulating a stable reference voltage, which circuit has such structural, functional and consumption features such that it can be realized by a reduced number of components. Moreover, the electronic circuit is supplied by one of the voltage signals produced inside the circuit itself, thereby lowering the overall power consumption and improving the stable characteristics of the generated reference voltage signal Vr.

The electronic circuit is able to follow dynamically the system block, thus operating in a switching mode.

The electronic circuit uses as the supply voltage, the controlled signal SENSE produced by the system block itself, and applies such supply voltage to a band-gap regulator which additionally includes comparing and error amplifying means.

In other words, the band-gap circuit portion, intended to generate a stable voltage reference from the supply voltage, is to carry out the following functions:

1) generating the reference, that is the "set point" signal Vr;
2) comparing the reference with a normalized controlled signal; and
3) providing an error controller function.

The features and advantages of the circuit and the method according to the invention will be apparent from the following description of embodiments thereof, given by way of non-limitative examples with reference to the accompanying drawings.

DETAILED DESCRIPTION OF THE INVENTION

Figure 3:
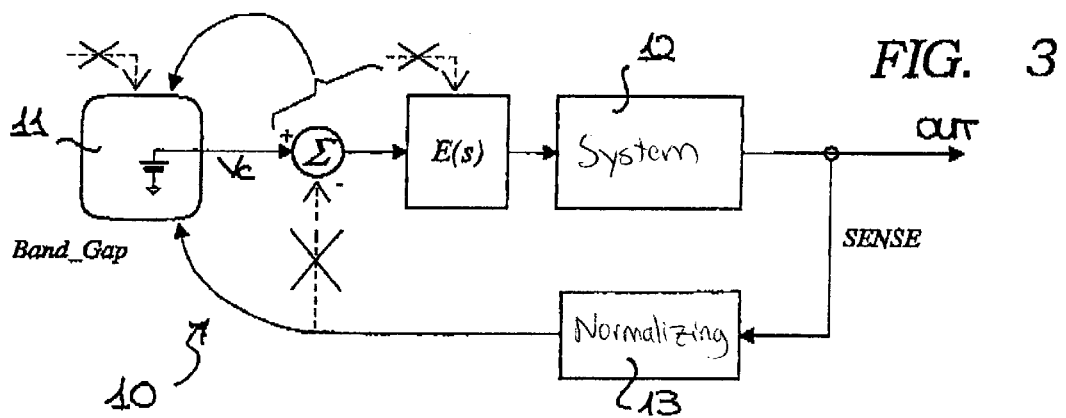
FIG. 3 shows a schematic block view of an electronic circuit for regulating a stable reference voltage, according to this invention.

Referring to the drawing views and in particular to the example of FIG. 3, an integrated electronic circuit according to the invention, for regulating a stable reference voltage Vr, is generally shown at 10 in schematic form. The circuit 10 may be defined as a switching type band-gap controller.

The circuit 10 comprises a band-gap generator 11 intended to provide a control voltage Vc to a system block 12. A voltage signal SENSE is picked up at the output OUT of the system block 12 and it is directly transferred to the band-gap generator 11 through a normalizing block 13.

Advantageously, the voltage signal SENSE is therefore used to power the band-gap, error amplification and comparison circuit portions which are inserted in the regulating loop of the circuit 10.

The circuit 10 is useful in automotive applications, and accordingly, would be installed on an automobile vehicle which is also equipped with an alternator associated to propulsion means. The alternator output voltage VGO, although affected by noise, is used to power less critical areas of the vehicle's own electronic circuitry.

Such areas as digital circuits and power stages show, in fact, a greater consumption.

Advantageously, and in order to keep down consumption, the band-gap generator 11 combines the functions of:

a reference generator;
an error amplifier; and
a comparator.

This is specially advantageous in that the line on which the signal SENSE is present cannot be overloaded with current (<1 mA) lest the regulation effectiveness is impaired by unavoidable voltage drops to resistances along the connection.

Figure 4:
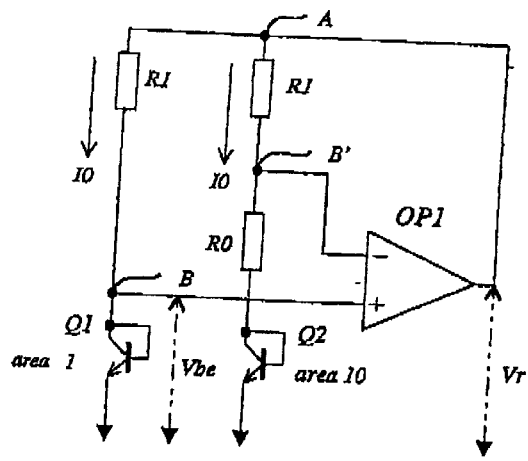
FIG. 4 shows a schematic view of a conventional band-gap generator circuit.

In the example of FIG. 4, the circuit layout of a conventional band-gap generator is schematically shown. This layout is modified in the embodiment of FIG. 5 to incorporate the aforementioned functions.

The circuit of FIG. 4 includes an operational amplifier OP1 effective to regulate the voltage of a node A so that the potentials of the nodes B and B' can be made to coincide. Since the nodes B and B' are connected to the node A through resistors R1 with the same value, and are coupled to ground through respective transistors Q1 and Q2 diode-connected in the generator, the same current Io will be flowing through the respective circuit legs containing such transistors.

Thus, said transistors Q1, Q2 are forced to operate on the same current value Io, and with the transistor Q2 being selected larger (at least ten times larger) in area than the transistor Q1, a voltage "ΔVbe" would drop across the resistor Ro interconnecting the resistor R1 and transistor Q2 which is given by:

$$\Delta Vbe = VT * ln(areaQ2/areaQ1) \qquad (1)$$

where, VT is the thermal voltage.

The value of the reference voltage Vr output from the generator of FIG. 4 is given by equation (2) below.

$$Vr = Vbe(Q1) + \Delta Vbe * R1/R0 \qquad (2)$$

The value of the controlled voltage, designated Vs, presented on the SENSE line can be obtained from equation (3) below on account of the regulating loop.

$$Vs = K * Vr = K * (Vbe(Q1) + \Delta Vbe * R1/R2) \qquad (3)$$

Figure 5:
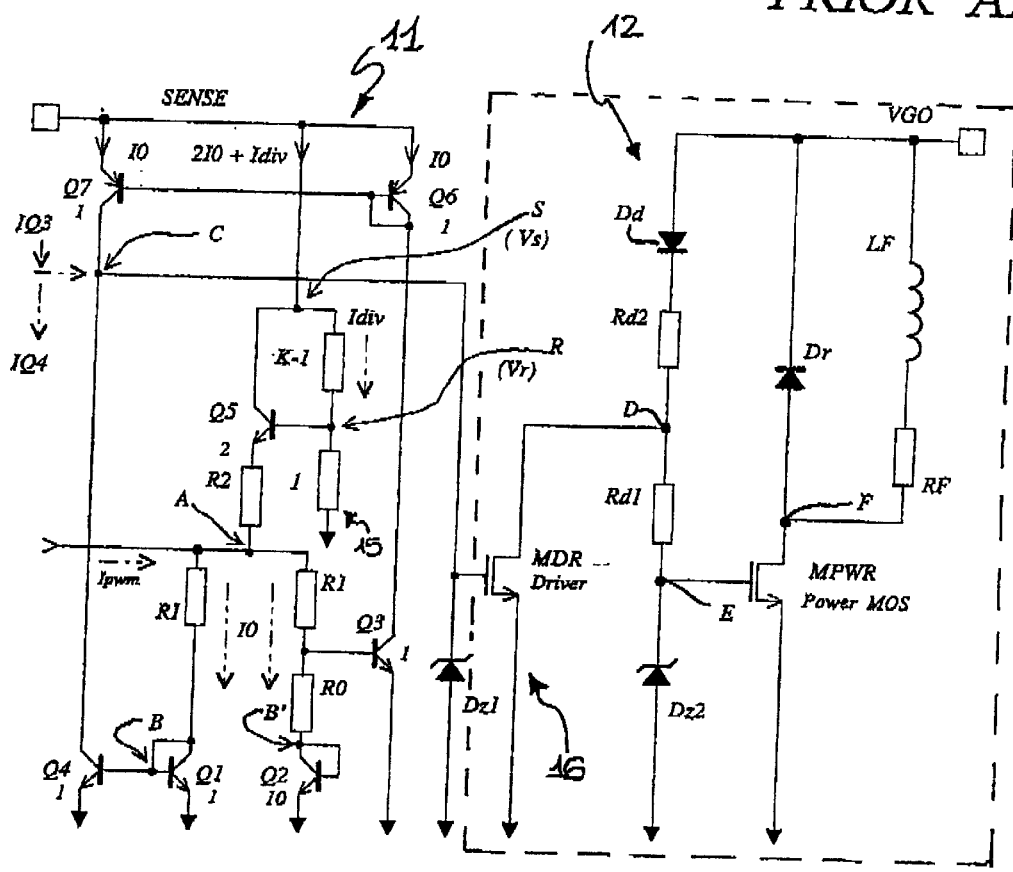
FIG. 5 shows a schematic view of a band-gap generator for use in the electronic circuit of FIG. 3, according to the invention.

Now, the generator 11 incorporated to the circuit 10 of FIG. 3 has been modified from the just described basic structure, and the outcome of this modification is shown in FIG. 5.

The circuit shown in FIG. 5 allows equation 3 to be applied directly to the signal Vs from the band-gap reference generator of FIG. 4.

As can be appreciated from the diagram of FIG. 5, the band-gap generator 11 is powered from the line SENSE directly picked up from the output OUT of the system block 12 (FIG. 3). In a possible alternative embodiment even the block 13 may be considered incorporated inside the new block 11, as will be clarified in the following lines.

The generator 11 comprises a first circuit leg connecting the SENSE line to ground and including a complementary pair of bipolar transistors, namely a pnp transistor Q7 connected to an npn transistor Q4 at a node C.

A second circuit leg connects the SENSE line to ground and includes a complementary pair of bipolar transistors, namely a pnp transistor Q6 connected to an npn transistor Q3.

The bases of the transistors Q7, Q6 are connected together. Also, the transistor Q6 is a diode configuration so as to form a current mirror in combination with the transistor Q7. Thus, a current Io will flow through each of said legs.

In essence, the first and second circuit legs form an external current mirror, as against the internal current mirror of the band-gap generator of FIG. 4, in place of the error amplifier provided by the prior art.

A third circuit leg connects the SENSE line to ground, but branches off into additional legs as described herein below.

A first connection of the third leg includes a resistive divider 15 connecting a node S, that is the SENSE line, to ground through a resistor pair connected to a node R from which the signal Vr is picked up.

A second connection of the third leg includes an npn bipolar transistor Q5 which is connected in series with a resistor R2. The base of the transistor Q5 is connected to said node R of the divider 15. The transistor Q5 and the divider 15 implement the block 13 in FIG. 3.

The end of the resistor R2 that is not connected to the transistor Q5 provides a node A whence the following branch off:

a connection including a resistor R1 and an npn bipolar transistor Q1;

a connection including a series of two resistors R1 and R0 and an npn bipolar transistor Q2.

The transistor Q1 is a diode configuration and has its base interconnected with the base of the transistor Q4 of the first circuit leg. This interconnection represents a circuit node B.

The diode-configured transistor Q2 has its base coinciding with a circuit node B'. The base of the transistor Q3 in the second circuit leg is connected to the interconnection node between the resistors R1 and R0.

The node A is accessible to receive a current ramp Ipwr.

The node C of the first circuit leg is connected to ground through a Zener diode Dz1 and connected to the gate terminal of an N-channel field-effect transistor MDR to drive a circuit portion 16 which is associated with a vehicle alternator being a part of the system block 12.

A power transistor, e.g., an N-channel MOS transistor MPWR, has one conduction terminal coupled to an alternator coil LF through a resistor RF, and has the other conduction terminal connected to ground.

Placed in parallel to the series of the coil and the resistor RF is a loop-back diode Dr connecting a node F to a line supplying a signal VGO.

A resistive divider is placed between this supply line VGO and the ground, which divider is made of at least two resistors Rd1, Rd2 and is coupled to the supply line VGO and to the ground through respective diodes. More particularly, a diode Dd is inserted between the supply line VGO and the divider, while a Zener diode Dz2 is inserted between ground and the divider.

One conduction terminal of the drive transistor MDR of the circuit portion 16 is connected to the interconnection node D between the divider resistors Rd1, Rd2, while the other conduction terminal of the transistor MDR is connected to ground.

The features of the generator 11 will now be reviewed in further detail.

Compared with the circuit layout of a conventional band-gap generator, such as that shown in FIG. 4, the generator 11 has the transistor pair Q3, Q4 in place of the error amplifier OP1 of FIG. 4. In essence, it is as if the band-gap generator 11, as a whole, were also having an error amplifier function.

In addition, the transistor Q5, selected with twice the area than the transistor Q1 to set the desired regulation voltage at the SENSE node, takes the place of the voltage "normalizer" block according to the prior art.

Figure 1:
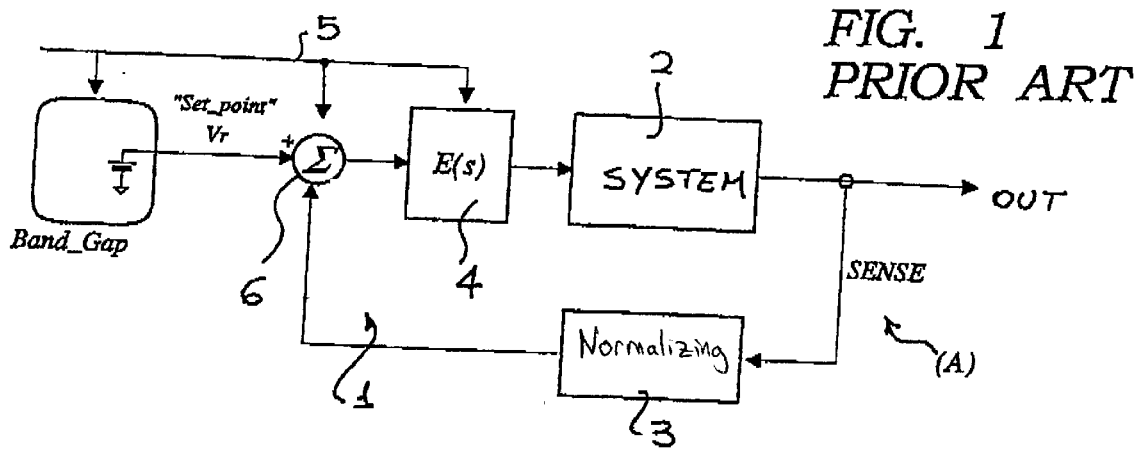
FIG. 1 shows a schematic block view of an electronic circuit for regulating a stable reference voltage, according to the prior art.
Figure 2:
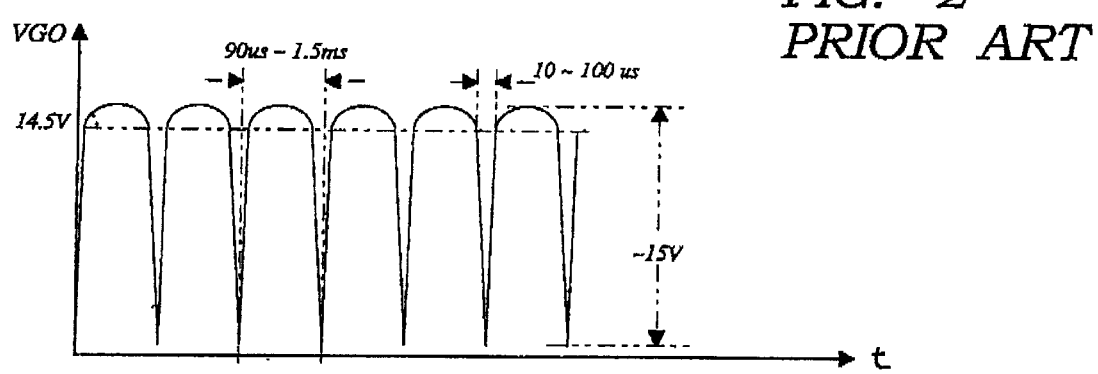
FIG. 2 shows a diagram voltage vs. time schematically showing the pattern of a supply voltage present in the supply line of FIG. 1.

The current mirror, or similar, formed from the transistors Q6 and Q7 to create the comparison function (node C), instead of the prior art comparator shown in FIG. 1;

Application to the node A of a current ramp, operating at a low voltage ($\approx 1V$), allows a possible PWM regulation which is effected with a voltage ramp in conventional PWM modulators. It will be shown herein below that the "relay" operation of the structure is made possible by removing the current ramp (Ipwm=0)).

The regulating method implemented by the generator 11 and the regulator 10 will now be reviewed.

In relay operation, or whenever the current ramp Ipwm is nil, the voltage Vs is:

$$Vs/K = Vbe(Q1) + R1/R0 * \Delta Vbe + 2*R2*\Delta Vbe/R0 + Vbe(Q5) \quad (4)$$

The two voltage drops Vbe taken into account by the equation are related to the same current since the transistor Q5, being required to carry a double current than the transistor Q1, has been selected in its turn with a double area. In this way, equation (4) essentially represents the sum of two "band-gap" equations and is, therefore, fully controllable.

The ramp current Ipwm should be generated by a generator of a constant voltage Vpwm which may be very small (<0.5V) as indicated by the following equations. The fundamental condition is that its average value be nil. Calling IpwmM the highest value attained by the ramp current, the variations of Vs at the extremities of the duty-cycle value of the control signal, at the node C, are given by:

$$(Vs \pm \Delta Vs)/K = Vbe(Q1) + R1R0*\Delta Vbe + 2*R2*\Delta Vbe/R0*(1 \pm R2*IpwmM) \quad (5)$$

so that PWM gain becomes:

$$\Delta Vs = K*R2*IpwmM \quad (6)$$

Equation 6 is wholly independent of the value of slope vs. temperature assigned to Vs. This is another advantage over the prior art structure of FIG. 1. Regulators for use with alternators usually require that dVs/dT be other than zero and negative. In the conventional regulator of FIG. 1, this is obtained by assigning an adequate slope vs. temperature to the reference voltage signal Vr. In the PWM regulator, this compels the average value of the voltage ramp to be also made to depend on temperature and according to the same rule, in order not to miss the modulation gain.

Figure 6:
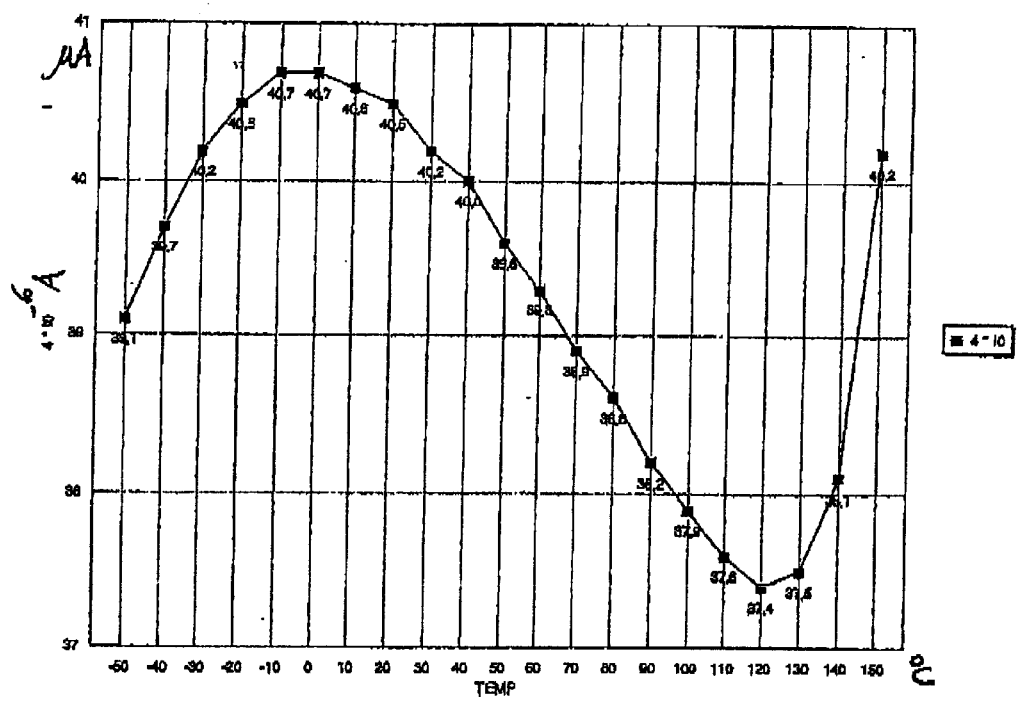
FIG. 6 is a diagram of current vs. temperature schematically showing the pattern of the current consumption signal present in the regulator circuit of FIG. 3 according to this invention.

The connection of the novel circuit to the SENSE line poses no problems because of the load level from the circuit being quite small. Referring to FIG. 6, current consumption by the SENSE line is:

$$Is = (Idiv + 4*Io) \quad (7)$$

Current Idiv is impossible to suppress, same as in the state of the art of FIG. 1, but can be fully controlled by acting on the values of the resistances in the normalizer K.

The additional current required for the circuit of FIG. 5 to operate, is four times larger than the current Io set by the area ratio of the transistors Q1 and Q2, and the resistance value of the resistor R0. With BCD technology, putting the area of the transistor Q2 at ten times the area of the transistor Q1 of the P-body type, and putting R0 at least equal to 6000 Ohms, of the P-body type, the current 4*Io becomes like that shown in the experimental graph of FIG. 6.

It can be seen that this current does not exceed the value 41 µA throughout the temperature range. Therefore, the value of current consumption by the SENSE line is well contained within the limit of 1 mA.

It can be appreciated from the foregoing description that the regulator circuit 10 of this invention has the following advantages over the prior art shown in FIG. 1:

1) The regulating loop is greatly simplified by the loop combining the following primary functions:
   1.a the reference generator (Q1, Q2, R0, R1, R2);
   1.b the error amplifier for the loop (the whole circuit);
   1.c conditioning the voltage to be regulated (divider K and Q5);
   1.d the comparator for switching regulation (Q4, Q7).
2) The structure of the generator 11 considerably simplifies the provision of the following secondary functions:
   2.a very low consumption that allows using the SENSE line as the supply line (4*Io);
   2.b simplified PWM modulation control by using a current rather than a voltage ramp, which can be thus generated at a low voltage (R2, Ipwm);
   2.c the control at dVs/dT (Vs slope versus temperature) other than zero requiring, unlike the circuit of FIG. 1, no shifting of the voltage ramp as temperature varies;
   2.d the whole circuit can also operate at very low SENSE voltages, typically of 1.2V.

Modifications and changes can be made unto the regulator circuit of this invention within the scope of the invention as defined in the appended claims.

For example, the generator circuit structure could be obtained using MOS instead of bipolar transistors.

Figure 7:
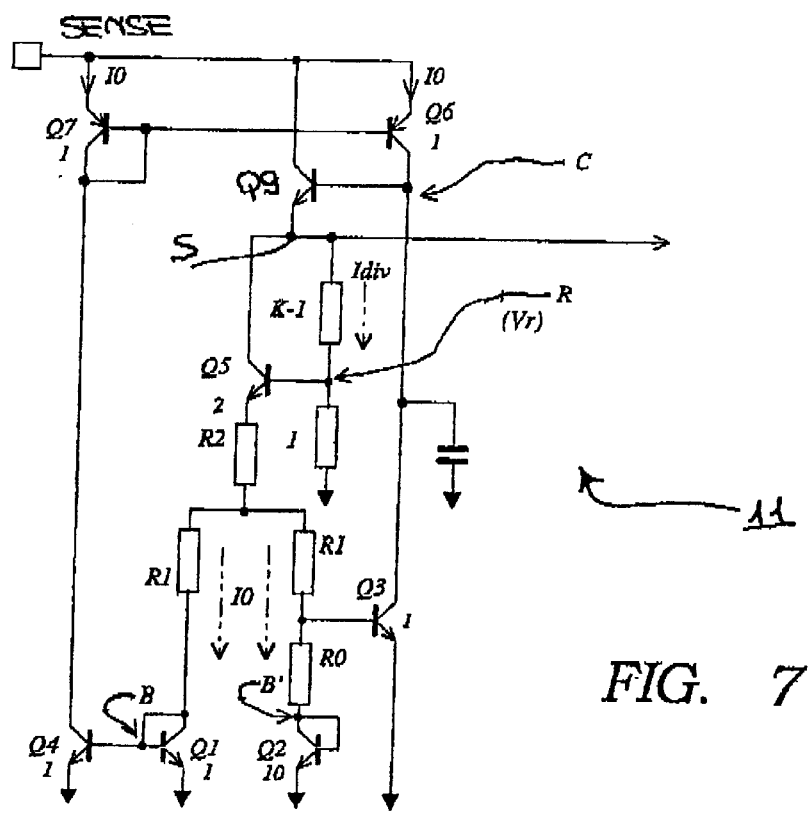
FIG. 7 schematically shows a modified embodiment of the generator of FIG. 5.

Also, in regulators which operates in the linear mode, the layout of the generator 11 can be easily adapted by inserting an npn bipolar transistor Q9 in between the SENSE line and the collector of Q5, node S (FIG. 7). The base of the transistor Q9 would be connected in a connection node C between the transistors Q6 and Q3 of the second circuit leg and coupled to ground through a capacitor for the dynamic stabilization.

The node S would become the regulated output of the generator circuit in the linear mode, as schematically shown in FIG. 7.

So, the regulator 10 supplies circuit elements corresponding to all the block 11, 6, 4 and 3 of the prior art by the output signal on the output node S. In this respect, the reference voltage produced by the Band-Gap block 11 may be obtained through another kind of voltage regulator, for instance a voltage reference obtained by a zener diode.

The electronic circuit according to the present invention is capable of directly controlling the system block 12. The control phase is advantageously performed in a switching mode, the linear mode being also available as an option.

The circuit block 11 doesn't require an external supply voltage since it is supplied by the signal SENSE that is the output of the system block. This block 11 provides the output voltage Vc for controlling the system block 12.

Thus, the electronic circuit of the invention allows a switching control of the system block 12 since it works in a switching mode even inside. As a matter of fact the current and voltages inside the inventive circuit are variable in time and not only with temperature.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated self-powered and switching electronic circuit for regulating a stable reference voltage, comprising:
   a voltage generator and regulator to produce said stable reference voltage for a system circuit block;
   a comparator and an error amplifier structured to supply said system circuit block with a regulated voltage;
   a regulating loop between the output of the system block and the input of the voltage generator and regulator;
   wherein said voltage generator and regulator incorporates said comparator and said error amplifier and is directly supplied by a supply signal produced by the system block.

2. A circuit according to claim 1, wherein a normalizer block is inserted on the regulating loop and incorporated in said voltage generator and regulator.

3. A circuit according to claim 1, wherein said voltage generator and regulator comprises a current mirror that includes first and second current mirror circuit legs independently connecting a regulated voltage supply line to ground and including an output node for controlling the system circuit block.

4. A circuit according to claim 3, wherein said current mirror is outside of an internal current mirror of the voltage generator and regulator incorporating respective circuit nodes at coinciding potentials, and that each of said legs is coupled to a corresponding one of the nodes, respectively.

5. A circuit according to claim 1, wherein said voltage generator and regulator comprises a pair of transistors being in a diode configuration and coupled to a common node through respective resistors, said node being supplied by said supply signal through a connection which incorporates a series of a transistor and a resistor.

6. A circuit according to claim 5, wherein said transistor in said connection has twice the area of one of said diode-configured transistors.

7. A circuit according to claim 5, wherein said transistor in said connection has its control terminal connected to an interconnection node of a resistive divider inserted between the supply signal and ground.

8. A circuit according to claim 5, wherein said voltage generator and regulator comprises a current mirror that includes first and second current mirror circuit legs independently connecting the supply signal to ground and wherein, for linear mode applications, a transistor is inserted between the supply signal and said connection which has a control terminal connected to one of said circuit legs and a conduction terminal connected to a node forming a regulated output of the voltage generator and regulator.

9. A circuit according to claim 5, wherein said node receives a current ramp signal for PWM modulating the voltage generator and regulator.

10. A circuit according to claim 9, wherein said ramp is produced by a low-voltage generator.

11. A method for regulating a stable reference voltage to be supplied to a system block by means of a voltage generator and regulator producing said stable reference voltage, wherein said voltage generator and regulator incorporates the functions of a comparator and an error amplifier and is directly supplied by a signal produced by said system block.

12. A regulated electronic circuit employing a regulated reference voltage, comprising:

a system block having an input for receiving the regulated reference voltage and an output at which a supply voltage is produced; and a reference voltage generator structured to supply the regulated reference voltage and having an input coupled to the output of the system block and an output coupled to the input of the system block, the reference voltage generator including a comparator coupled between the input and output of the reference voltage generator, an error amplifier coupled to the comparator, and a regulator coupled to receive the supply voltage from the input of the reference voltage regulator, the regulated reference voltage being supplied at an output of the comparator.

13. The circuit of claim 12, wherein the reference voltage generator includes a normalizer block coupled between the regulating loop and either the input or the output of the reference voltage generator.

14. The circuit of claim 12, wherein the comparator and error amplifier include:

a first current mirror having first and second mirror transistors each having a first conduction terminal coupled to the input of the reference voltage generator and a second conduction terminal;

first and second amplifier transistors respectively connected between a reference voltage and the second conduction terminals of the first and second mirror transistors.

15. The circuit of claim 14 wherein the regulator includes a second current mirror having a first and second mirror legs respectively coupled to respective control terminals of the first and second amplifier transistors.

16. The circuit of claim 15 wherein the first and second mirror legs of the second current mirror are connected at a first node and the reference voltage generator includes a normalizing transistor connected between the node and the supply voltage.

17. The circuit of claim 16 wherein the comparator includes an output transistor connected between the supply voltage and the normalizing transistor, the output of the reference voltage generator being a second node connected between the output and normalizing transistors.

18. The circuit of claim 16 wherein the first node receives a current ramp signal for PWM modulating the reference voltage generator.

19. The circuit of claim 12 wherein the comparator includes an output transistor connected between the input and output of the reference voltage generator.

20. A reference voltage generator for generating a regulated reference voltage, comprising:

a first current mirror having first and second mirror transistors coupled to a supply voltage;

a second current mirror having first and second mirror transistors, the first mirror transistors of the first and second current mirrors being coupled together;

a normalizing transistor coupled between the supply voltage and the second mirror transistor of the second current mirror; and an output terminal at which the regulated reference voltage is supplied, the output terminal being coupled to either the first current mirror or the normalizing transistor.

21. The reference voltage generator of claim 20, further comprising an output transistor coupled between the supply voltage and the normalizing transistor, the output terminal is a node between the normalizing transistor and the output transistor.

* * * * *